United States Patent [19]

Larsen et al.

[11] Patent Number: 5,620,075
[45] Date of Patent: Apr. 15, 1997

[54] C-SHAPED SYNCHRONIZER SPRING

[75] Inventors: Jonathan G. Larsen, Sarn; Keith Roberts, Maesteg; Gary I. Skipper, Morriston, all of Wales

[73] Assignee: Borg-Warner Automotive, Inc., Sterling Heights, Mich.

[21] Appl. No.: 508,612

[22] Filed: Jul. 28, 1995

[51] Int. Cl.$^6$ .................................................. F16D 23/06
[52] U.S. Cl. ........................................ 192/53.34; 74/339
[58] Field of Search .......................... 192/53.34, 53.343, 192/53.36; 74/339

[56] References Cited

U.S. PATENT DOCUMENTS

| | | |
|---|---|---|
| 2,190,964 | 2/1940 | White . |
| 2,221,900 | 11/1940 | White et al. . |
| 2,364,331 | 12/1944 | White . |
| 2,478,355 | 8/1949 | Auten .................................. 192/53.343 |
| 2,488,044 | 11/1949 | Voigt ..................................... 192/53.34 |
| 2,993,579 | 7/1961 | Attmann . |
| 3,035,674 | 5/1962 | Peras . |
| 3,272,291 | 9/1966 | Flinn . |
| 3,366,208 | 1/1968 | Kelbel . |
| 3,414,098 | 12/1968 | Kelbel . |
| 3,700,083 | 10/1972 | Ashikawa et al. . |
| 4,428,469 | 1/1984 | Morscheck et al. . |
| 4,584,892 | 4/1986 | Hiraiwa et al. . |
| 4,660,707 | 4/1987 | Sadanori et al. . |
| 4,776,228 | 10/1988 | Razzacki et al. ................. 192/53.34 X |
| 4,809,832 | 3/1989 | Inui . |
| 4,828,087 | 5/1989 | Kudo et al. . |
| 4,830,158 | 5/1989 | Uno et al. . |
| 4,842,112 | 6/1989 | Inui . |
| 4,875,566 | 10/1989 | Inui et al. . |
| 4,889,003 | 12/1989 | Rietsch . |
| 5,036,719 | 8/1991 | Razzacki . |
| 5,113,986 | 5/1992 | Frost . |
| 5,131,285 | 7/1992 | Weismann et al. . |
| 5,269,400 | 12/1993 | Fogelberg . |
| 5,339,936 | 8/1994 | Lauer et al. . |

FOREIGN PATENT DOCUMENTS

| | | |
|---|---|---|
| 0167319 | 1/1986 | European Pat. Off. . |
| 0272134 | 6/1988 | European Pat. Off. . |
| 955937 | 4/1964 | United Kingdom . |

*Primary Examiner*—Rodney H. Bonck
*Attorney, Agent, or Firm*—Brooks & Kushman; Greg Dziegielewski

[57] ABSTRACT

A synchronizer clutch assembly for a transmission comprising a synchronizer hub carried by a torque delivery shaft and including a cone clutch member carried by a gear forming a part of the transmission gearing and a synchronizer blocking ring. A C-shaped spring member is positioned in the inner circumference of the rim portion of the clutch hub and has a plurality of lugs which extend through openings in the hub. The shiftable clutch sleeve has ramped ridges engageable with the lugs on the spring member and compress the lugs radially inwardly. The blocker ring cone clutch frictionally engages the cone clutch of the gear upon movement of the clutch sleeve toward an engagement position until the rotary motion of the gear is brought into synchronism with the rotary motion of the shaft.

6 Claims, 2 Drawing Sheets

C-SHAPED SYNCHRONIZER SPRING

TECHNICAL FIELD

This invention relates to automotive transmissions and more particularly to synchronizer clutches for controlling changes in transmission gearing.

BACKGROUND OF THE INVENTION

Synchronizer clutch assemblies for manual transmissions typically include an intermediate torque transfer shaft situated between a torque input shaft and a torque output shaft. Located in parallel disposition with respect to the intermediate shaft is a cluster gear assembly. Torque delivery gears of different pitch diameters are positioned adjacent the intermediate shaft, and a synchronizer clutch assembly is disposed adjacent one of the gears or between two adjacent gears. The synchronizer clutch assembly functions to drivably connect the torque delivery gears for rotation and unison or to connect one or both of the gears selectively to the intermediate shaft. The synchronizer clutch assembly synchronizes rotary motion of the gears, one with respect to the other, or rotary motion of one or both of the gears selectively with respect to the intermediate shaft prior to the establishment of a driving connection between the rotary members.

Synchronizer clutch assemblies for manual transmissions are shown, for example, in U.S. Pat. Nos. 2,221,900 and 3,366,208. In the '900 patent, a synchronizer clutch hub is splined to the intermediate shaft at a location between two gears of different pitch diameter. A clutch sleeve with internal clutch teeth is mounted for axially sliding movement on the synchronizer hub. The gear to be synchronized with respect to the shaft carries external clutch teeth as well as an external clutch surface. A synchronizer clutch blocker ring is disposed between the sleeve and external clutch teeth to the gear. The blocker ring is formed with an internal cone surface adapted to engage the external cone surface of the gear.

Various spring members are known which are secured to or in cooperative engagement with the blocker ring and engageable by the clutch sleeve as the sleeve is moved toward the gear to be synchronized. As the spring elements are compressed, a blocker ring cone clutch engaging force is created which energizes the friction cone clutch and causes the synchronizer blocker ring to index annularly relative to the synchronizer hub. Spring members which are secured to or operatively interconnected with the blocker ring are shown, for example, in co-pending U.S. patent application Ser. No. 08/278,860, filed on Jul. 26, 1994, and assigned to the same. Assignee as the present invention. Other spring members for synchronized transmission are shown, for example, in U.S. Pat. Nos. 3,700,083, 4,660,707 and 4,828,087.

BRIEF DESCRIPTION OF THE INVENTION

It is an object of the present invention to provide an improved synchronizer clutch assembly. It is also an object of the present invention to provide an improved spring member for a synchronizer clutch assembly.

It is another object of the present invention to provide a spring or resilient member for a synchronizer clutch assembly in which the spring member is simpler and less costly to manufacture and assemble in the system. It is a still further object of the present invention to provide a spring member for a synchronizer clutch assembly which has improved performance and operation.

These and other objects of the present invention are secured with the synchronizer clutch assembly in accordance with the present invention. The synchronizer clutch assembly includes a synchronizer clutch hub located adjacent a gear to be synchronized relative to a shaft that carries the synchronizer hub. A clutch sleeve having internal clutch teeth is mounted on the synchronizer clutch hub for axial movement for engagement and disengagement with the gear to be synchronized. The gear to be synchronized includes a cone clutch and external synchronizer teeth that are axially disposed with respect to the internal clutch teeth on the sleeve.

A blocker ring is disposed between the gear teeth and the internal teeth of the sleeve. A cone clutch surface is formed in the blocker ring and is adapted to frictionally engage the gear cone. A flat C-shaped spring member is positioned in an annular recess in the clutch hub. The spring member has at least three outwardly projecting lugs which are positioned in corresponding spaces or gaps between the external teeth on the hub. The blocker ring also has corresponding openings or spaces between the blocker teeth and the spaces are aligned with the lugs on the spring member.

The spring member is generally C-shaped with two arms. When the lugs are compressed radially during operation of the clutch assembly, the arms flex towards each other. The C-shaped spring member is formed by a stamping procedure or other similar method and has a flat cross-sectional shape in order to lie flat in the annular recess in the hub and lie flush against the inner surface of the blocker ring. The arms of the spring member are initially biased outwardly to aid in the assembly of the clutch mechanism.

The projecting lugs on the spring member are engageable by certain of the teeth of the clutch sleeve as the sleeve is moved toward the gear to be synchronized. As the lugs are depressed, a blocker ring cone clutch engaging force is created which energizes the friction cone clutch. This causes a radial force to be generated which in turn causes the synchronizer blocker ring to index annularly relative to the synchronizer hub. The teeth of the synchronizer ring and blocker ring travel with the sleeve. Movement of the sleeve toward the gear causes engagement of the cone surfaces on the inside of the blocker ring with the gear cone surface, thereby creating a radial force component on the cone clutch which changes the relative angular velocity of the gear to be synchronized until synchronism is established between the gear and the shaft.

After synchronization is established between the hub, synchronizer ring and gear, the radial force component falls to zero. The thrust force of the sleeve causes the synchronizer ring to move radially due to the contact between the teeth of the ring and the teeth of the sleeve. This radial movement causes alignment of the ring and sleeve teeth and allows the sleeve to move axially through the teeth of the synchronizer ring and to engage the dog teeth of the gear cone assembly.

These and other objects, features and benefits of the invention will become apparent from the following description of the invention, when viewed in accordance with the attached drawings and appended claims.

BEST MODE(S) FOR CARRYING OUT THE INVENTION

Figure 1:
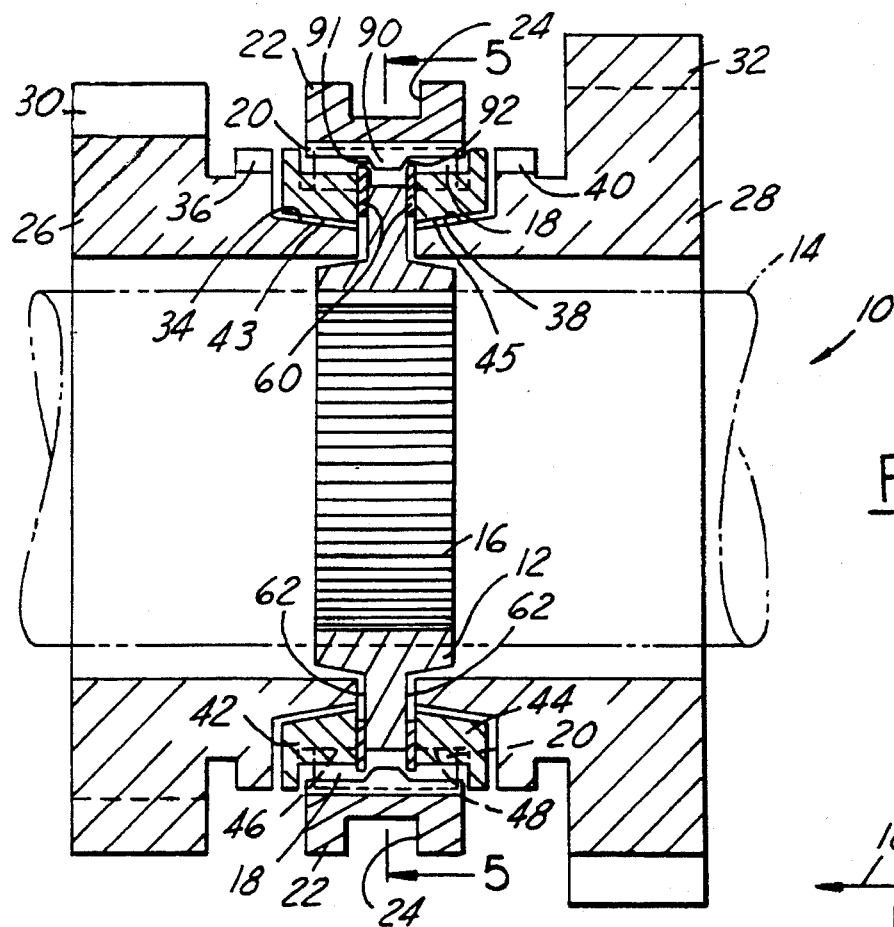
FIG. 1 is a cross-sectional view of a double-acting synchronizer assembly for a manual transmission incorporating the present invention.

A double-acting synchronizer assembly for a manual transmission is designated by the numeral 10 in FIG. 1. The assembly includes a synchronizer clutch hub 12 which is splined or otherwise secured to a shaft member 14 shown in phantom in FIG. 1. For this purpose, the central opening of the clutch hub 12 includes a series of teeth 16. The teeth 16 assure that the clutch hub is secured to and rotates with shaft 14.

The periphery of the synchronizing clutch hub 12 is provided with external splined teeth 18 that register with internal teeth 20 of an axially movable synchronizer clutch sleeve 22. A groove 24 is formed on the external periphery of the sleeve 22 to receive shifter fork fingers that are carried by a shift fork rail (not shown) for the manual transmission.

The synchronizer clutch hub 12 and clutch sleeve 22 are positioned between a pair of gears 26 and 28. In the assembly 10 shown in FIG. 1, gear 26 is a small pitch diameter gear while gear 28 is a large pitch diameter gear. Each of gears 26 and 28 include gear teeth 30 and 32, respectively, that mesh with gear teeth formed on a cluster gear assembly (not shown) for the transmission.

Gear 26 is formed with a gear cone surface 34 and gear teeth 36. The gear teeth 36 are also called "dog teeth" and are provided on the gear 26 between the teeth 30 and the gear cone surface 34. The teeth 36 are provided with lead-in chamfer surfaces as is well known in the art.

Similarly, gear 28 is provided with a gear cone surface 38 and an annular ring of gear teeth (or dog teeth) 40. The teeth 40 also have lead-in chamfer surfaces (not shown).

Figure 2:
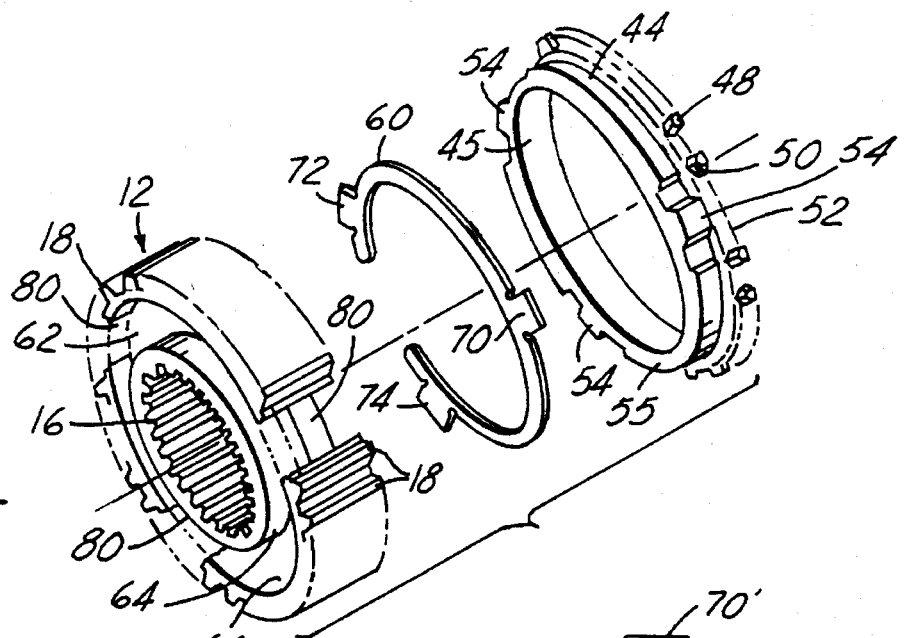
FIG. 2 is an exploded view of a portion of the cross-sectional view of FIG. 1 depicting a synchronizer clutch hub, a C-shaped energizing spring member, and a blocker ring.

Blocker rings 42 and 44 are positioned on opposite sides of the synchronizer clutch hub 12. (Blocker ring 44 is also shown in FIG. 2.) The blocker rings are also known as "synchronizer rings". Each of the blocker rings 42 and 44 are provided with a ring of teeth 46 and 48, respectively, surrounding the periphery of the blocker rings. These teeth are also provided with lead-in chamfer surfaces, such as surfaces 50 shown on blocker ring 44 in FIG. 2.

Three spaces 52 are provided in the ring of gear teeth 48 and 46 on the blocker rings 42 and 44. Raised bosses or projections 54 are provided on the blocker rings in axial alignment with the spaces 52.

When the synchronizer assembly 10 is assembled, the teeth 20 of the sleeve 22, the teeth 46 and 48 of the blocker rings 42 and 44, respectively, and the teeth 36 and 40 on the gears 26 and 28 respectively, are all in axial alignment. Teeth 18 on hub 12 are also in axial alignment with the other teeth. This allows the clutch sleeve 22 to be able to move into engagement with the gears 26 and 28 as desired during shifting of the transmission.

Figure 3:
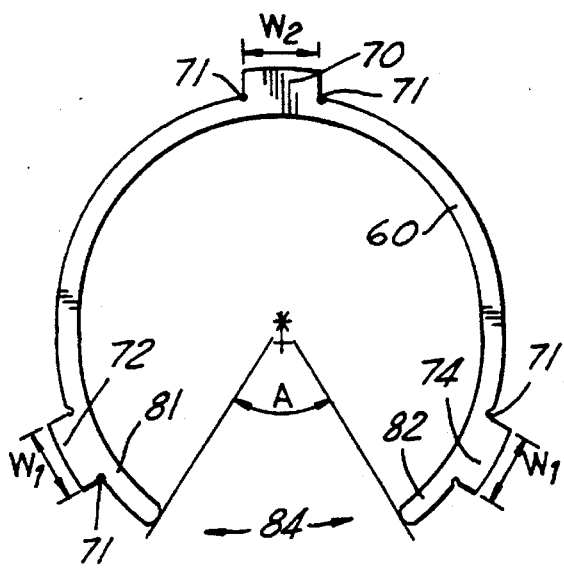
FIG. 3 is an elevational view of a flat C-shaped spring member in accordance with the present invention.

A generally C-shaped spring member 60 is positioned in the synchronizer assembly 10 between the hub 12 and each of the blocker rings 42 and 44. One of the spring members is shown in FIG. 3. An exploded view of a subassembly including the hub, spring member and blocker ring is shown in FIG. 2. The clutch hub 12 has annular recessed portions 62 positioned on both sides thereof, the recesses 62 being positioned between internal cylindrical shoulder 64 and external cylindrical shoulder 66.

The spring member 60 is preferably made from a flat piece of stamped metal material such as steel, and has two or more and preferably three protruding tabs or lugs 70, 72 and 74. Small fillets or radii 71 are provided on each side of the lugs 70, 72 and 74 where they extend from the central body of the spring member 60, creating small clearance spaces. These spaces are provided to provide clearance between the spring member 60 and tabs 70, 72 and 74 if any burrs or rough edges remain on the edges of the openings in the clutch hub 12.

The clutch hub 12 has three openings or spaces 80 in the cylindrical surfaces 66 and the plurality of teeth 18 positioned on the periphery of the clutch hub. The openings 80 all have uniform width and are provided in order to mate with the lugs 70, 72 and 74 of the spring member 60.

When the spring members 60 are assembled with the hub 12, the spring members are positioned in the recessed area 62 with the lugs 70, 72 and 74 protruding through the openings 80. In order to aid assembly and interconnection between the spring members 60 and hub 12, the spring member 60 is formed such that the arm members 81 and 82 provide an outward spring force against the cylindrical surface 66. Also, the width W1 of lug members 72 and 74 is less than the width W2 of lug members 70. This allows the lug members 72 and 74 to have some freedom of movement or "play" in the circumferential direction in their respective openings 80 in the clutch hub 12.

The spring member 60 is generally C-shaped with an opening 84 between the ends of the arm members 81 and 82. Angle A is more than 5° and less than 90°. Although the actual angle A as shown in FIG. 3 is not critical, it is important that there be at least some clearance between the ends of the arm members 81 and 82 in order to allow movement relative to each other during operation of the clutch assembly.

The inner surfaces 43 and 45 of the blocker rings are angled corresponding to the angle of the cone surfaces 34 and 38 on the gears 26 and 28. The surfaces 43 and 45 also are covered with friction members (not shown) which are conventional in the art. The friction members help apply torque to the gears when the blocker ring is moved onto and secured to the gear cone surfaces.

When the clutch hub, C-shaped spring member 60 and blocker ring 44 are assembled, the spaces 80 on the hub, the lugs 70, 72 and 74 on the spring member, and the spaces 52 and raised ridges 54 on the blocker rings are all positioned in axial alignment. Thereafter, when that subassembly is mated with the other parts of the synchronizer and gear assembly 10, the clutch sleeve 10 is positioned on the other periphery of the hub 12 and the gears 26 and 28 are positioned on the opposite sides as shown. As indicated above, the clutch sleeve 22 has a plurality of teeth 20 around the inner circumference or surface. Raised ridges 90 are formed on three of the teeth spaced 120° apart. Each of the ridges 90 have angled surfaces 91 and 92 in axial alignment with the shaft and gear teeth. The surfaces 91 and 92 act as ramps or cam surfaces.

In the assembly 10 shown in FIG. 1, the clutch sleeve 22 is in the neutral position. In this position, the ridge 90 is axially positioned between the two spring members 60 and the teeth 20 are not engaged with the teeth on the blocker ring or the gear teeth 36 and 40.

When the clutch sleeve is assembled with the other parts discussed above, the three teeth with the raised ridges 90 are positioned in axial alignment with the openings 80 in the hub 12 and the spaces 52 in the teeth on the blocker rings 42 and 44. In this manner, the raised ridges 90 are positioned to come in contact with the lugs or tabs 70, 72 and 74 on the spring member 60.

The ends of the teeth on the inner surface of the clutch sleeve also have lead-in chamfer surfaces. This effectuates lead-in of the teeth with the teeth 48 on the blocker rings, as well as the dog teeth 36 and 40 on the gears.

Figure 4:
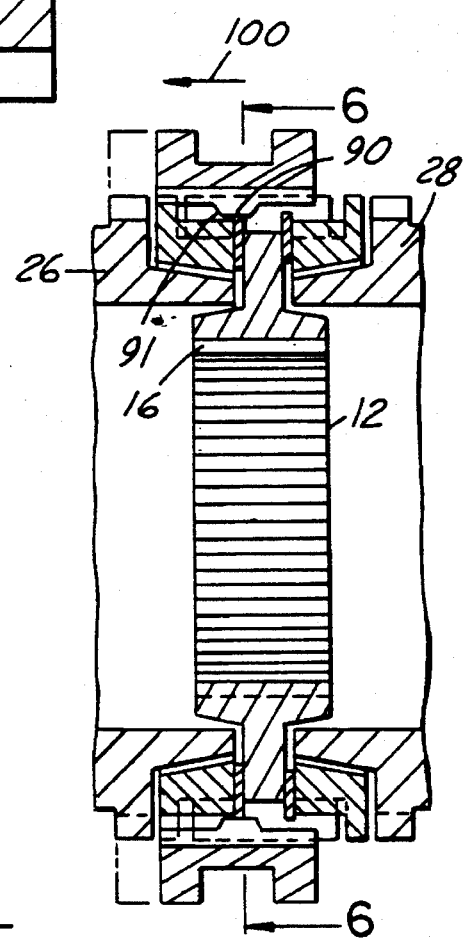
FIG. 4 is a partial cross-sectional view of the double-acting synchronizer assembly shown in FIG. 1, but showing the sleeve engaging the teeth of the blocker ring.

In operation of the clutch mechanism, the clutch sleeve 22 is moved axially by the shift fork rail toward engagement of one of the gears 26 or 28. The situation in which the sleeve 22 is moved toward engagement with gear 26 is shown in FIG. 4. The procedure for engagement with gear 28 is similar, but in the opposite direction.

Figure 5:
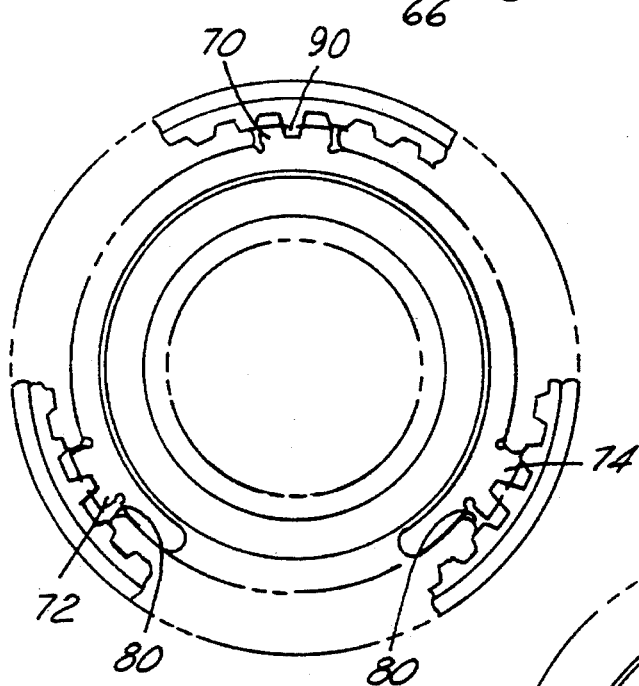
FIG. 5 is a cross-sectional view of the synchronizer assembly shown in FIG. 1, the view taken along lines 5—5 in FIG. 1 and in the direction of the arrows.
Figure 6:
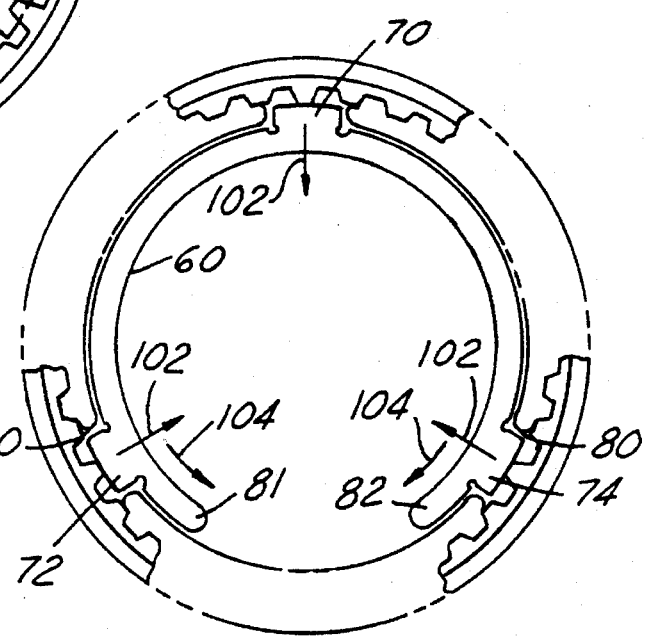
FIG. 6 is a cross-sectional view of the synchronizer assembly shown in FIG. 4, the view taken along lines 6—6 in FIG. 4 and in the direction of the arrows.

As shown in FIG. 4, when the clutch sleeve 22 is moved in the direction of arrow 100, the ramp surface 91 and raised projection 90 cause the corresponding tab or lug on the spring member 60 to be depressed in a downward radial direction. Since there are three raised ridges 90 and three tangs 70, 72 and 74, each of the lugs 70, 72 and 74 are compressed in a radial downward direction when the clutch sleeve is moved toward either of the gears 26 and 28. As shown in FIG. 6, compression of the lugs 70, 72 and 74 cause arms 81 and 82 of the C-shaped spring member 60 to move in an inward and downward direction. This is shown by arrows 102 and 104. In this regard, FIG. 6 can be compared with FIG. 5 wherein the C-shaped spring member is in its neutral and uncompressed condition. The shifting or movement of the lugs 72 and 74 in a circumferential direction (shown by arrows 104) in the spaces 80 in the clutch hub 12 is also shown by comparison of FIGS. 5 and 6.

When the lugs of the spring member are compressed as the clutch sleeve passes over them, the spring is caused to move axially against the blocker ring. This forces the blocker ring into engagement with the gear cone.

As indicated above, the spring member 60 has the raised portions 70, 72 and 74. The raised portions are compressed by the ramp portions 91 and 92 as the sleeve 22 moves relative to the hub. When the ramp portions pass over the lugs 70, 72 and 74, the leading edges of the teeth on the clutch sleeve begin to engage the chamfered lead-in edges 50 of the blocker ring teeth 48. The axial force on the sleeve 22, upon engagement of the blocker ring teeth, establishes a clutching force on the blocker ring, thereby imparting a synchronizing torque on the gear 26. When the gear and synchronizer clutch hub 12 are in synchronism, the teeth of the clutch sleeve can then move through the blocker ring teeth onto engagement with the dog teeth 36 on the gear 26, thereby locking the shaft 10 to the gear 26. The initial force caused by the engagement of the sleeve teeth with the spring member 60 will cause the blocker ring to index to the angular extent permitted. Since spring member 60 is positioned adjacent the blocker ring, ramp 91 causes the spring member to be forced against the inner surface 55 of the blocker ring in an axial direction.

As indicated, the synchronizer and gear assembly 10 has a synchronizer blocker ring on each side of the hub 12. The operation of the synchronizer clutch elements associated with gear 28 is the same as that described above relative to gear 26, merely with movement of the clutch sleeve 22 in the opposite direction. Thus, the synchronizer elements associated with the synchronizer and gear assembly 10 function in the same manner regardless of in which axial direction the clutch sleeve 22 is moved.

Due to the shape and configuration of the spring members 60, they do not bend or twist in the axial direction during operation of the assembly. The flat shape of the spring member allows the ends 81 and 82 to flex in the manner described above, and for the lugs 70, 72 and 74 to be radially compressed when the clutch sleeve is moved toward the gears 26 and 28.

The fact that the arms 81 and 82 of the spring member are initially biased outwardly and have to be compressed in order to position the spring member in the annular recess 62 in the clutch hub, allows for easier assembly of the synchronizer and gear assembly 10. When the assembly 10 is assembled, the lugs 70, 72 and 74 are positioned in the spaces 80 in the hub, and one of the flat sides of the spring member is positioned in contact with the bottom of the recess 62. Thereafter, the blocker ring is assembled in that same recess 62 such that the surface 55 is positioned flush against the opposite side of the flat spring member 60. When the blocker ring is assembled with the hub, the projections 54 are positioned such that they are axially aligned with lugs 70, 72 and 74 and spaces 80. Due to the positioning and functioning of the spring members 60, it is not necessary with the present invention to affix the spring member 60 to the blocker ring. Thus, it is not necessary to weld, clamp or otherwise interlock the spring member to the blocker ring.

Figure 7:
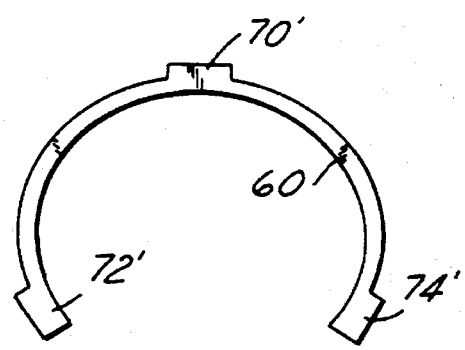
FIG. 7 illustrates an alternate embodiment of the spring member.

An alternate embodiment of a C-shaped spring member 60' is shown in FIG. 7. The use and operation of the spring member 60' are the same as those described above with reference to spring member 60.

The various portions of the synchronizer and gear assembly 10 can be made of materials that are conventional in the art, and can be made by any well known conventional methods or machining. For example, it is common practice to manufacture synchronizer clutch assemblies with blocker rings which are formed of brass or that are formed by powdered metal casting techniques. The synchronizer blocker ring may also be formed by an orbital forging process that comprises cold working flat carbon steel stock.

The geometry and structure of the present inventive system allows significant flexibility for optimization of the system and its operation for any particular application. For example, the C-shaped spring can have many variations in stiffness, deflection rates and materials in order to increase the operation and benefits of the system. Also, the number of parameters which can be varied to allow optimization of the system is greatly increased.

The design of the synchronization ring is also simplified in accordance with the present invention. Special recesses or pockets for the location of the spring are unnecessary. The spring further is simple and cheap to manufacture in comparison to many other synchronizer springs.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A synchronizer clutch assembly for a manual transmission having at least one torque transfer gear and a torque delivery shaft, said clutch assembly comprising:

a clutch hub adapted to be secured to said shaft, a clutch sleeve secured to said hub and adapted for axial shifting movement relative to said hub, said clutch sleeve having a plurality of clutch teeth;

a blocker ring adapted to be positioned between said gear and said hub, said blocker ring having an engageable friction clutch surface; and a flat C-shaped spring member positioned between said blocker ring and said hub, said spring member having a plurality of projecting lugs engageable with at least one of said clutch sleeve teeth as said sleeve is moved toward said blocker ring, whereby a clutch surface engaging force is developed on said blocker ring by said spring member.

2. The assembly as set forth in claim 1 wherein said spring member has three lugs and said lugs are compressible radially inwardly upon engagement with said clutch sleeve teeth.

3. The assembly as set forth in claim 1 wherein said clutch teeth on said sleeve are internal clutch teeth, and further comprising ramped projection means on a plurality of clutch teeth and positioned to engage said plurality of projecting lugs.

4. In a synchromesh transmission having a drive shaft with at least one gear loosely mounted on the shaft, a hub secured to said shaft and a clutch sleeve coupled in rotation on the shaft and slidable on said hub to operative position for engaging the gear to couple the gear in rotation with said shaft, said improvement comprising a blocker ring coupled to said shaft for rotation therewith, a C-shaped flat spring member positioned between said hub and said blocker ring to press said blocker ring against the gear and couple the same in rotation when the sleeve is displaced towards said operative position, said spring member having a plurality of projecting lugs and said clutch sleeve having a plurality of radially inwardly facing teeth positioned adjacent said lugs and adapted to contact said lugs upon movement of said sleeve, said teeth having a raised projection with inclined surfaces thereon.

5. The transmission as set forth in claim 4 wherein said blocker ring and hub have a plurality of axial aligned circumferential openings corresponding in number to the plurality of lugs on said spring member.

6. The transmission as set forth in claim 5 wherein three of said lugs and openings are provided.

* * * * *

REEXAMINATION CERTIFICATE (3838th)

United States Patent [19]
Larsen et al.

[11] B1 5,620,075
[45] Certificate Issued Aug. 17, 1999

[54] C-SHAPED SYNCHRONIZER SPRING

[75] Inventors: Jonathan G. Larsen, Sarn; Keith Roberts, Maesteg; Gary L. Skipper, Morriston, all of United Kingdom

[73] Assignee: Borg-Warner Automotive, Inc., Sterling Heights, Mich.

Reexamination Request:
No. 90/005,046, Jul. 23, 1998

Reexamination Certificate for:
Patent No.: 5,620,075
Issued: Apr. 15, 1997
Appl. No.: 08/508,612
Filed: Jul. 28, 1995

[51] Int. Cl.$^6$ ............................................. F16D 23/06
[52] U.S. Cl. ............................................. 192/53.34; 74/339
[58] Field of Search ........................... 192/53.34, 53.343, 192/53.36; 74/339

[56] References Cited

U.S. PATENT DOCUMENTS

| | | |
|---|---|---|
| 2,190,964 | 2/1940 | White . |
| 2,221,900 | 11/1940 | White et al. . |
| 2,364,331 | 12/1944 | White . |
| 2,478,355 | 8/1949 | Auten ................. 192/53.343 |
| 2,488,044 | 11/1949 | Voight ................. 192/53.34 |
| 2,993,579 | 7/1961 | Attmann . |
| 3,035,674 | 5/1962 | Peras . |
| 3,272,291 | 9/1966 | Flinn . |
| 3,366,208 | 1/1968 | Kelbel . |
| 3,414,098 | 12/1968 | Kelbel . |
| 3,700,083 | 10/1972 | Ashikawa et al. . |
| 4,428,469 | 1/1984 | Morscheck et al. . |
| 4,584,892 | 4/1986 | Hiraiwa et al. . |
| 4,660,707 | 4/1987 | Sadanori et al. . |
| 4,776,228 | 10/1988 | Razzacki et al. ......... 192/53.34 X |
| 4,809,832 | 3/1989 | Inui . |
| 4,828,087 | 5/1989 | Kudo et al. . |
| 4,830,158 | 5/1989 | Uno et al. . |
| 4,842,112 | 6/1989 | Inui . |
| 4,875,566 | 10/1989 | Inui et al. . |
| 4,889,003 | 12/1989 | Rietsch . |
| 5,036,719 | 8/1991 | Razzacki . |
| 5,113,986 | 5/1992 | Frost . |
| 5,131,285 | 7/1992 | Weismann et al. . |
| 5,269,400 | 12/1993 | Fogelberg . |
| 5,339,936 | 8/1994 | Lauer et al. . |

FOREIGN PATENT DOCUMENTS

| | | |
|---|---|---|
| 0 167 319 | 1/1986 | European Pat. Off. . |
| 195519 | 9/1986 | European Pat. Off. . |
| 0 272 134 | 6/1988 | European Pat. Off. . |
| 1343412 | 2/1962 | France . |
| 2268986 | 11/1978 | France . |
| 2390633 | 12/1978 | France . |
| 2470897 | 6/1981 | France . |
| 1065282 | 9/1959 | Germany . |
| 26 39 662 | 3/1978 | Germany . |
| 32 25 201 | 1/1984 | Germany . |
| 44 44 385 | 6/1995 | Germany . |
| 955937 | 4/1964 | United Kingdom . |

*Primary Examiner*—Rodney H. Bonck

[57] ABSTRACT

A synchronizer clutch assembly for a transmission comprising a synchronizer hub carried by a torque delivery shaft and including a cone clutch member carried by a gear forming a part of the transmission gearing and a synchronizer blocking ring. A C-shaped spring member is positioned in the inner circumference of the rim portion of the clutch hub and has a plurality of lugs which extend through openings in the hub. The shiftable clutch sleeve has ramped ridges engageable with the lugs on the spring member and compress the lugs radially inwardly. The blocker ring cone clutch frictionally engages the cone clutch of the gear upon movement of the clutch sleeve toward an engagement position until the rotary motion of the gear is brought into synchronism with the rotary motion of the shaft.

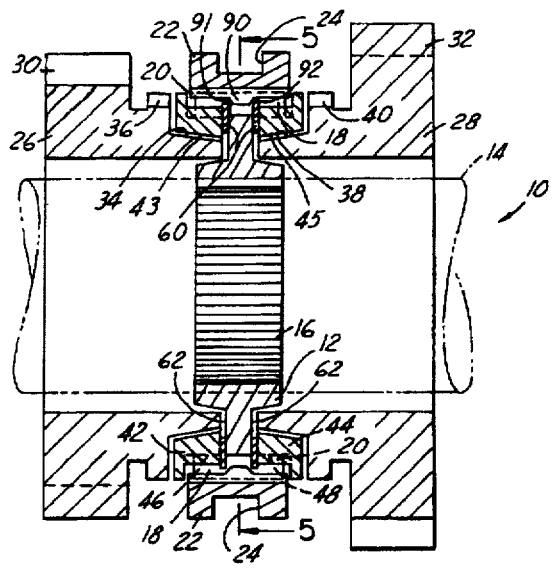

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *